(12) United States Patent
Del Gaudio et al.

(10) Patent No.: US 8,709,982 B2
(45) Date of Patent: Apr. 29, 2014

(54) ADDITIVES FOR OIL RECOVERY FROM RESERVOIRS

(75) Inventors: Lucilla Del Gaudio, San Donato Milanese (IT); Thomas Paul Lockhart, Lodi (IT); Emanuele Vignati, Canegrate (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 12/596,283

(22) PCT Filed: Apr. 2, 2008

(86) PCT No.: PCT/EP2008/002669

§ 371 (c)(1),
(2), (4) Date: Nov. 17, 2009

(87) PCT Pub. No.: WO2008/128628

PCT Pub. Date: Oct. 30, 2008

(65) Prior Publication Data

US 2010/0120638 A1 May 13, 2010

(30) Foreign Application Priority Data

Apr. 19, 2007 (IT) .............................. MI2007A0808

(51) Int. Cl.
C09K 8/60 (2006.01)
C23F 11/14 (2006.01)
E21B 43/16 (2006.01)

(52) U.S. Cl.
USPC ........... 507/222; 507/244; 507/935; 507/936; 166/305.1

(58) Field of Classification Search
USPC ............... 507/222, 241, 935, 936; 166/305.1
See application file for complete search history.

(56) References Cited

U.S. PATENT DOCUMENTS

| | | | | |
|---|---|---|---|---|
| 4,374,739 A | * | 2/1983 | McLaughlin et al. | 507/223 |
| 4,460,483 A | | 7/1984 | Weaver | |
| 4,485,021 A | * | 11/1984 | Purcell et al. | 507/244 |
| 6,395,853 B1 | | 5/2002 | Oswald et al. | |
| 6,502,637 B2 | * | 1/2003 | Smith | 166/294 |
| 2004/0144542 A1 | | 7/2004 | Chiappa et al. | |
| 2005/0067164 A1 | * | 3/2005 | Ke et al. | 166/304 |
| 2007/0112518 A1 | * | 5/2007 | Montaron | 702/1 |

FOREIGN PATENT DOCUMENTS

| | | |
|---|---|---|
| EP | 1 243 749 | 9/2002 |
| GB | 2 107 759 | 5/1983 |
| RU | 1825394 | 6/1993 |
| RU | 1820659 | 8/1995 |
| RU | 2180396 | 3/2002 |
| WO | 02 097236 | 12/2002 |
| WO | 2005 124097 | 12/2005 |

* cited by examiner

*Primary Examiner* — Aiqun Li
(74) *Attorney, Agent, or Firm* — Oblon, Spivak, McClelland, Maier & Neustadt, L.L.P.

(57) ABSTRACT

The invention relates to the use of quaternary polyamines having formula (I) for the recovery of oil from reservoirs formula (I), wherein $n \geq 1$ $R_1$ represents H, $CH_3$, $CH_2CH_3$, $C_nH_{2n+1}$ $R_2$ represents $H_2CHOHCH_2$, $CH_2$, $CH_2CH=CH_2$ $R_3$ represents $CH_3$, $CH_2CH_3$, $C_nH_{2n+1}$ $R_4$ represents $CH_2$, $CH_2CH=CH_2$ when $R_2$ and $R_4$ are allyl group, they can jointly form aliphatic cyclic structures, the ratio between the carbon atoms and nitrogen atoms (C/N) ranges from 2 to 30.

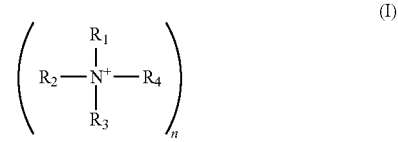

(I)

25 Claims, 3 Drawing Sheets

Carbonate powder pre-treated for 10 days at 80°C with the crude oil C.

Oil release in the presence of anionic and cationic surface active agents

Oil removal capability of Floc 572 in comparison with different surfactants and polymers Oil removal: CTAB and Floc 572 at 0.1% comparison Imbibition capability: Floc 572 e CTAB comparison

ADDITIVES FOR OIL RECOVERY FROM RESERVOIRS

The present invention relates to the use of additives capable of increasing the recovery of oil from reservoirs preferably carbonate and with a low permeability.

More specifically, it relates to the use of additives capable of modifying the wettability of the rock from oil-wet to water-wet without causing a lowering in the interfacial tension (oil-wet refers to a surface substantially wet by oil, vice versa water-wet refers to a surface predominantly wet by water).

About half of the known oil reservoirs in the world are of the carbonate type. The particular nature of these reservoirs together with the fact that they are generally fractured, have a low permeability and are oil wet, makes it difficult to recover the oil and the yields are generally much lower than 30%.

This is because the recovery process only involves the crude oil present in the fractures, whereas the oil contained inside the rock matrix is withheld as a result of the negative capillary pressure due to the oil-wet characteristics of the porous matrix.

The predominantly oil-wet nature of carbonate reservoirs is the result of physico-chemical interactions which have taken place over the years between the hydrocarbons and the rock surface and, in particular, the interaction between the carboxylic components present in the crude oil, which can be quantified with the acid number of the oil, and the rock surface. From this consideration, it follows that the re-establishment of the surface to the original water-wet conditions can be obtained by simply favouring the release of these components.

From the mid-nineties' onwards, numerous laboratories have directed their studies towards a search for additives which, when added to the injection water, are capable of increasing oil recovery from carbonate reservoirs.

All the methods so far developed are based on the use of surface-active agents or polymeric surface-active agents some of which have proved to be capable of inverting the wettability of the rock so that the entrapped oil can be spontaneously released.

One of the characteristics of surface-active agents however is that they decrease the oil-water interfacial tension which, by an imbibition process, leads to a great reduction in the capillary pressure, the driving force of the phenomenon.

This results in a slow imbibition kinetics and this is why, as of today, the industrial use of these additives has slowed down considerably.

Even if the problem has been recognized by experts in the field, a solution has not yet been found.

It has now been found that a particular group of additives, unlike what occurs with surface-active agents, is capable of modifying the wettability of the rock without lowering the water-oil interfacial tension.

In this way, a capillary pressure inversion is favoured, maintaining its absolute value high, and a spontaneous release of the oil is obtained with much higher recoveries than those so far obtained.

Two magnitudes such as the interfacial tension and the wettability are therefore treated as independent variables whereas with the approach so far adopted which envisaged the use of surface-active agents, the two magnitudes were necessarily combined.

This aspect is of particular importance considering that in recent years numerous research laboratories have directed their efforts towards the search for additives capable of favouring oil recovery from carbonate reservoirs without succeeding in identifying additives which do not lower the interfacial surface.

Bearing this in mind, an object of the present invention relates to the use of quaternary polyamines, having formula (I) for the recovery of oil from reservoirs

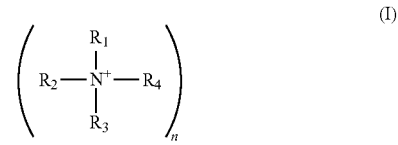

wherein $n \geq 1$ $R_1$ represents H, $CH_3$, $CH_2CH_3$, $C_nH_{2n+1}$ $R_2$ represents $H_2CHOHCH_2$, $CH_2$, $CH_2CH=CH_2$ $R_3$ represents $CH_3$, $CH_2CH_3$, $C_nH_{2n+1}$ $R_4$ represents $CH_2$, $CH_2CH=CH_2$ when $R_2$ and $R_4$ are allyl group, they can jointly form aliphatic cyclic structures, the ratio between the carbon atoms and nitrogen atoms (C/N) ranges from 2 to 30.

The ratio between the carbon atoms and nitrogen atoms (C/N) ranges from 2 to 20, and even more preferably from 2 to 12.

n is preferably $\geq 2$.

Figure 1:
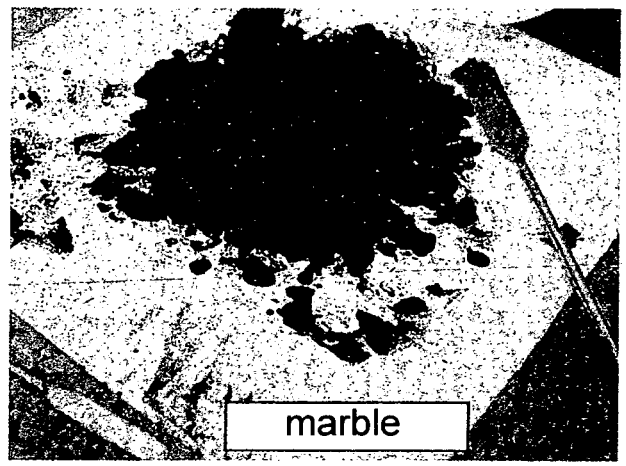
FIG. 1 shows an aged carbonate powder.

The use of the polyamines of the invention has proved to be particularly effective for the recover of oil from carbonate reservoirs.

The polyamines of the invention do not have surface-active properties, they are soluble in water and are particularly soluble in saline solutions.

The preferred cationic polyamines are those having formula II and III and IV indicated hereunder:

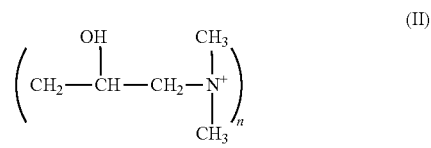

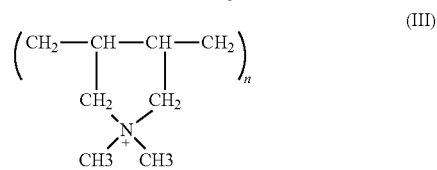

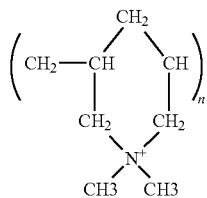

The structures III and IV represent the polymer which derives from the cyclization of diallyldimethylammonium chloride, in this case $R_1$ and $R_3$ are $CH_3$ whereas $R_2$ and $R_4$ are the two allyl groups which are cyclized in the polymerization.

In particular, the best performances have been obtained with polydiallyldimethylammonium chloride (polyDADMAC, III/IV) of which a commercial example is the compound FLOC 572 of 3F Chimica, used in the following examples.

For the purposes of the present invention, copolymers of the quaternary polyamines can also be conveniently used, for example: polyamines/polyacrylamides; polyamines/polyamides; polyamines/polyethyleneoxides; additives deriving from the quaternization of the Mannich reaction product obtained by reacting formaldehyde, polyacrylamide and a secondary amine.

In all these cases, the molar fraction of the copolymer must be lower than 30%, preferably lower than 20%.

The polyamines (or copolymers) of the invention do not have surface-active properties i.e. they do not modify the interfacial tension of the crude oil. In particular, they do not lower the interfacial tension of the crude oil to values <2 mN/m. They preferably maintain the interfacial tension of the oil at values >5 mN/m and even more preferably >10 mN/m.

The polyamines of the invention have much higher performances, in terms of oil release kinetics, than those of the cationic surface-active agents, generally used for this application.

A further object of the present invention relates to a method for increasing the oil recovery from reservoirs which comprises the preparation of an aqueous or saline solution of quaternary polyamines at concentrations ranging from 0.01% to 20% and subsequent injection into the well.

The polyamines are preferably used at concentrations ranging from 0.01% to 10% and more preferably from 0.05% to 5%.

The use of the polyamines of the invention as additives in the recovery activity of oil entrapped in the matrix of reservoirs, preferably carbonate, leads to the inversion of the wettability of the rock without modifying the interfacial tension. The imbibition kinetics, normally jeopardized by additives which lower the interfacial tension, is therefore increased and becomes compatible with the lifetime of a waterflood.

Furthermore, the non-surface-active-agent properties of these polymers reduce possible problems relating to the formation of foams and emulsions which can be observed in some of the production phases (for example in the separators) when surface-active agents are used.

The additives of the invention were selected through the use of two tests.

The first consists in the qualitative evaluation of the removal of oil from carbonate powder, whereas the second relates to the quantitative estimation of the imbibing capacity of the additives examined.

These methods are simple and effective for carrying out a rapid screening of additives capable of removing oil.

The first method is based on the oil-removing capacity of the additive and allows an easy screening and selection of the additives to be examined.

In particular, this method comprises the pretreatment of carbonate powder with crude oil and the subsequent dispersion of the pretreated powder in solutions of the additives at a certain concentration.

The effectiveness of the pretreatment depends on the type of crude oil (in particular its acid number), the temperature and duration. The conditions adopted for the test envisage the use of crude-oils having an acid number>0.25, temperatures ranging from 60 to 90° C. and a duration of the pretreatment >10 days.

It is preferable to operate with crude oils having an acid number >1.0 at a temperature of 80° C., and a pretreatment duration of 10 days.

The efficacy of the pretreatment lies in the capacity of reproducing a strongly oil-wet carbonate rock.

For a correct interpretation of the data, a crude oil must be used, with an interfacial tension >10 i.e. not polluted by surface-active agents, added during the production process.

The second method allows the imbibing capacity of the additives which gave a positive result in the screening test 1, to be quantitatively evaluated.

The test is effected using slices of rocks made oil-wet by suitable pretreatment of the crude-oil and evaluating the variation in their weight over a period of time (with the use of high-precision computerized scales) after immersion in the solution of the additive to be examined.

The pretreatment is again carried out using a crude-oil with a higher acid number (at least higher than 0.25) keeping the rock immersed in the oil for at least a week at a temperature >60° C. With the sequential use of the two methods, it is possible to rapidly, simply and effectively carry out the screening of numerous additives.

Four types of oils were evaluated for the aging tests of the carbonate powders and rock disks. Two, indicated as A and B, coming from an oil-field in the South of Italy (both were taken from the well head). The other two, called C and D, were taken from an oil-field in the North of Italy. Of these latter crude-oils, sample C was taken from the well head, whereas D comes from the oil centre. Heptane was used as model hydrocarbon for comparative purposes.

Table 1 indicates the acid number and interfacial tension for the four oils object of our study.

The best results were obtained with the oil C coming from a field in Northern Italy. The best performances of this oil are due to the high acid number value, associated with a high interfacial tension value (characteristic of a crude oil not contaminated by surface-active agents).

The oil D was actually rejected as it was considered as being contaminated by surface-active agents (revealed by the low interfacial tension value) probably added at the oil centre (as de-emulsifiers, corrosion inhibitors, etc.) during the oil separation process. In this respect it should be remembered that the presence of surface-active agents, added to the crude oil to be used, can jeopardize the wettability studies.

As far as the powders are concerned, carbonates having a different particle-size and composition (marble, Portland, calcium carbonate and microdol) were used.

With respect to the additives, surface-active agents soluble in water, representing the various groups of commercial surface-active agents (ionic, non-ionic and polymeric), were examined. In particular sodium dodecylsulphate (SDS) and dioctyl sodium sulfphosuccinate (AOT) were analyzed as anionic surface-active agents; dodecyltrimethylammonium bromide (DTAB) and cetyl trimethylammonium bromide (CTAB) as cationic surface-active agents; various ethoxylates and some polyglucosides (APG) as non-ionic surface-active agents. Atlox 4912 of Uniqema was selected as polymeric surface-active agent.

The polymers (non-surface-active agents) studied are water-soluble commercial polymers of 3F Chimica having different molecular weights and different charges (cationic and anionic), two cationic polymers of Floger were analyzed as a comparison.

EXAMPLES

The results of the tests are indicated in tables 2 and 3 and were carried out according to the procedures described in test 1 and test 2 specified below.

In particular, the objective of test 1 is to effect a rapid qualitative screening of the additives examined, to subsequently better evaluate the performances of the most interesting products by means of quantitative analysis effected with test 2. As the latter is longer and more laborious, it was only carried out on the best additives.

Test 1: Qualitative evaluation of the additives on the efficacy of the removal of crude-oil from pretreated powders. The test is developed in two phases:

a. Aging of the Carbonate Powder

The test consists in pretreating the powder for 10 days at a constant temperature (80° C.) in the oil C. The aging is effected in steel cylinders kept under rotation.

At the end of the aging, the samples were filtered on a filter paper and left to dry. The aged powder (FIG. 1) was weighed (4 g) in test-tubes and the aqueous solution (12 g) of the additives to be studied was added to this, at a concentration of 0.1%, (the pH of all the solutions tested was controlled).

The samples were stirred with a vortex for 2 minutes. The oil release was visibly observed.

Test 2: Imbibition Test

Disks of "Leccese" rock were pretreated in the oil object of the study (C) for 1 week at 80 degrees. The rock was immersed in oil under vacuum to ensure that it had been completely imbibed by the crude-oil.

The rock samples were hung by means of a basket to computerized scales.

The analysis was carried out by immerging the oil-imbibed "Leccese" rock samples in the aqueous solution of the additives to be tested, and following their weight variations in relation to time.

Interfacial Tension Measurements

Interfacial tension measurements were effected on the products which had produced good results with the tests, in order to evaluate their surface-active properties.

The measurements were carried out with three different instruments depending on the interfacial tension value to be measured. Low interfacial tension values were measured with a Spinning Drop (Data Physics), vice versa a tensiometer (Kruss) and Pendant Drop (Data Physics) were used for values higher than 2 mN/m.

Examples 1-14

Following the procedure described in test 1, the oil removal capacity of the compounds indicated in Table 2 was evaluated.

Table 2 indicates the results relating to the main surface-active agents tested compared with water, a solution of sodium carbonate, and ethylenediammonium chloride (and the relative base) representative of a simple molecule nitrogenated with non-polymeric quaternary nitrogen.

Figure 2:
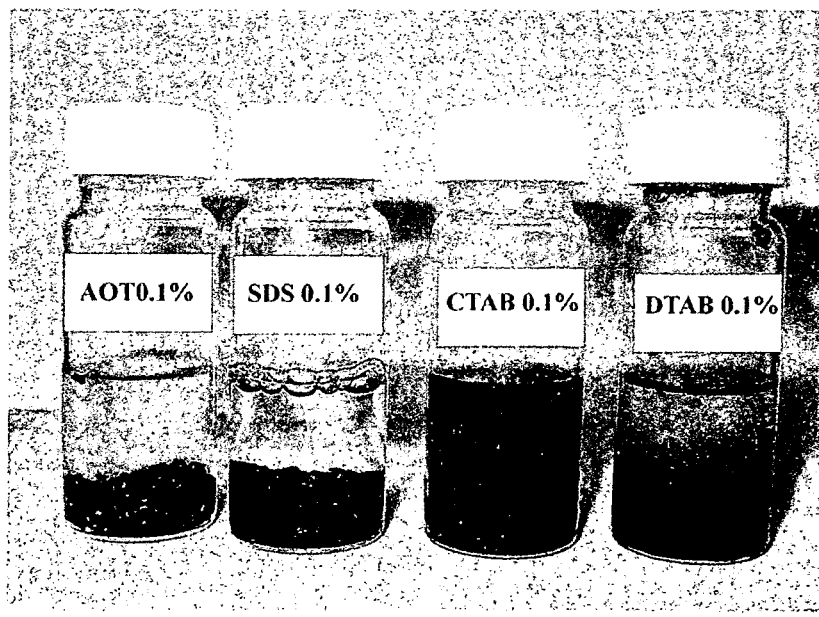
FIG. 2 shows oil release in the presence of surface active agents.

FIG. 2 shows the photo relating to the oil release of some of the surface-active agents used: AOT (dioctyl sodium sulphosuccinate), SDS (sodium dodecylsulphate), DTAB (dodecyltrimethylammonium bromide), CTAB (cetyl trimethylammonium bromide).

It can be observed how only the two cationic surface-active agents (DTAB and in particular CTAB) are capable of removing the oil.

The results show that under strong oil absorption conditions on the rock (such as those obtained in the test) the mechanisms involved in the oil removal are not the lowering of the interfacial tension or the solubilization of the oil inside the micelles, but the positive charge of the cationic surface-active agents. In this respect, it should be remembered that it has recently been demonstrated that cationic surface-active agents allow a better oil recovery with respect to the other groups of surface-active agents. It has been assumed that the cationic surface-active agent is able to complex the acid components adsorbed on the rock and remove them from this, re-establishing a water-wet surface, through an ionic-couple mechanism.

Examples 15-28

According to the procedure described in test 1, the oil removal capacity of polymeric compounds differing in charge and molecular weight, was evaluated.

A series of products of 3F Chimica (Floc) was analyzed and compared with two polymers of Floger (DP-PT, DP-FO). The cationic polymers are generally used as deflocculants for the water clarification. The characteristics of the products studied are indicated in Table 3, these are polyacrylamides, cationic polyamines (and a polydiallyldimethylammonium chloride polymer, called PolyDADMAC).

Table 3 indicates the compounds tested and the result of the test.

From Table 3 it can be seen that only a few cationic polyamines are capable of removing the crude oil, and in particular a polymer is indicated, Floc 572 (polydimethyldiallylammonium chloride, FIG. 3) which gives a highly positive result to the test.

Figure 3:
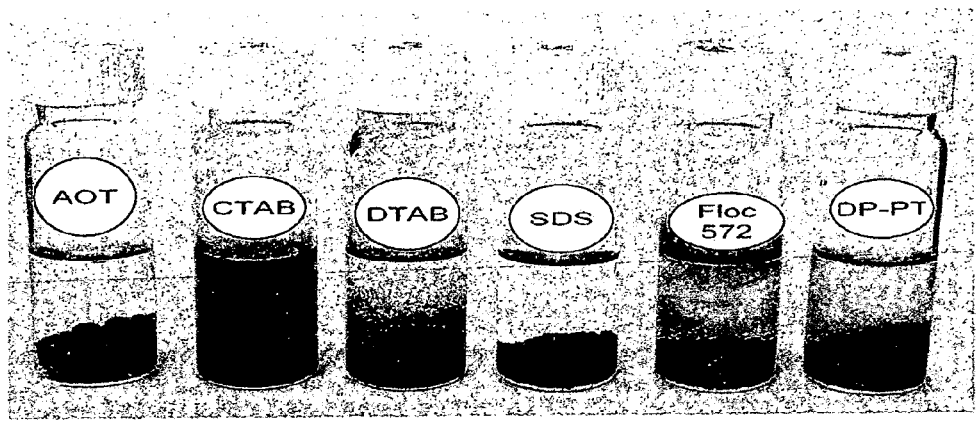
FIG. 3 shows oil removal comparisons with different surfactants and polymers.

The photo of FIG. 3 shows the oil removal capacity on the part of Floc 572 compared with surface-active agents. The photo also shows that the cationic polymer DP/PT does not work.

Figure 4:
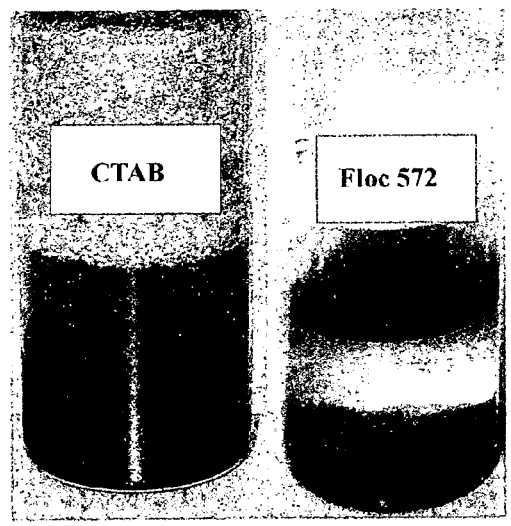
FIG. 4 shows a comparison of oil removal.

The photo of FIG. 4 refers to a comparison between the solutions of CTAB and the polymer Floc 572 at 0.1%. The photo shows the different performances of the two additives marked by a different interfacial tension of their aqueous solutions: the surface-active agent in fact dissolves the oil inside the micelles giving rise to the formation of a dark solution, vice versa the polymer clearly separates the oil.

Table 4 indicates the interfacial tensions of Floc 572 compared with CTAB. It can be seen that the polymer does not have surface-active properties, in fact, it slightly lowers the surface tension of the water and interfacial tension with heptane and the crude-oil A.

Test 2 was carried out on both additives in order to quantitatively evaluate the performances of Floc 572 compared with the cationic surface-active agent CTAB.

Example 29

The imbibing capacity of CTAB and Floc 572 is evaluated operating according to the procedure described in test 2.

Figure 5:
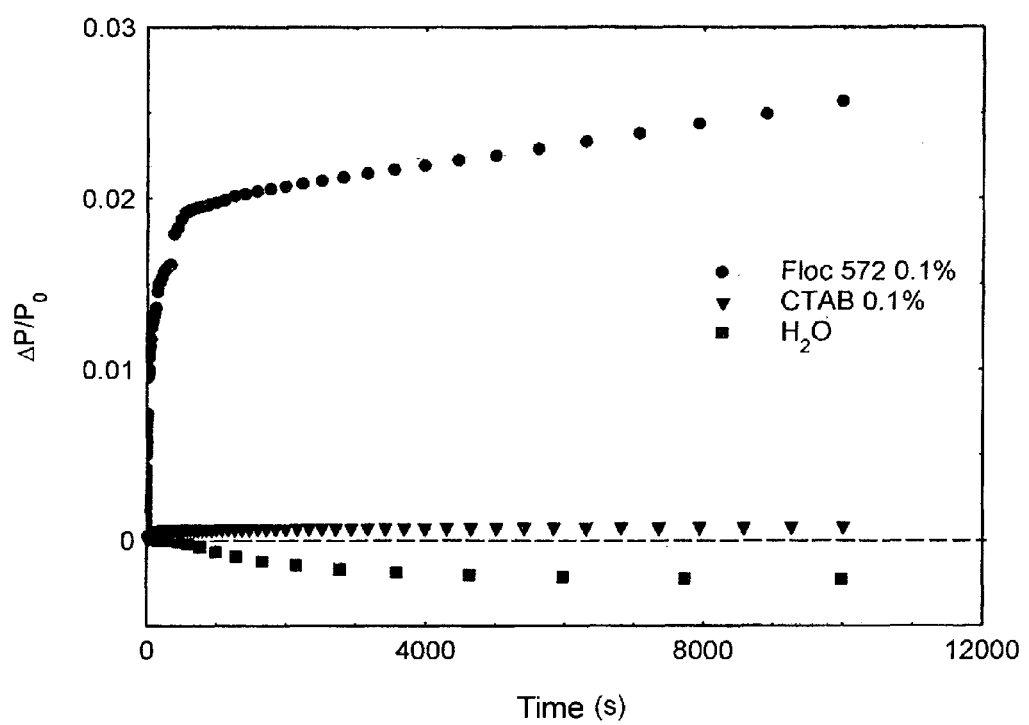
FIG. 5 shows a comparison of imbibition capability.

The results of the tests are clearly indicated in FIG. 5. The ordinate indicates the weight variation with respect to the initial dry weight. It can be observed that when the rock is immersed in water, a slight decrease in its weight is measured, indicating the fact that the water acts by removing the excess oil. Vice versa, both the surface-active agent and the polymeric solution cause an increase in the relative weight, if the former produces a marginal effect, however, the latter causes a variation of 2.8%.

Example 30

According to the procedure described in test 2, the imbibing capacity of a solution of Floc 572 in KCl 2% is evaluated compared with the same saline solution containing 0.1% of CTAB.

The results obtained are analogous to those obtained in Example 29. The test again showed the greater efficacy of the polymer in the oil substitution and confirms that a greater capillary pressure induced by the high interfacial tension allows an easier imbibition of the rock, leading to a greater oil recovery.

TABLE 1

Interfacial tension demineralized water oil and acid number of the crude-oils studied

| Crude Oils | Oil origin | Interfacial tension (25° C.) | Acid number (mg (g) KOH |
|---|---|---|---|
| A (35° API) | From the well in Southern Italy | 16 | 0.17 |
| B (32° API) | From the well in Southern Italy | 21.5 | 0.23 |
| D | From Centre in Northern Italy | 0.5 | 0.54 |
| C (19° API) | From the well in Northern Italy | 18 (at 40° C.) | 0.78 |

TABLE 2

Oil-removing capacity of the main surface-active agents compared with water, a solution of sodium carbonate and ethylenediammonium chloride.

| Examples | Aqueous solution | Result Test 1 | pH | $\gamma_i$ (mN/m) Crude oil | $\gamma_i$ (mN/m) Heptane |
|---|---|---|---|---|---|
| Ex. 1 | Demineralized water | No | 6 | 21.5 | 48.3 |
| Ex. 2 | Na$_2$CO$_3$ 0.1% | Slight removal | 11.3 | 25.6 | 48 |
| Ex. 3 | Ethylenediammonium chloride | no | 5.1 | | |
| Ex. 4 | Ethylenediamine 0.1% | no | 10.9 | | |
| Ex. 5 | SDS 0.1% | no | 4.2 | 8 | |
| Ex. 6 | AOT 0.1% | no | 6.9 | 8.9 | 14 |
| Ex. 8 | CTAB 0.1% | yes | 6.8 | 0.29 | 2.73 |
| Ex. 9 | CTAB 0.001% | no | 6.8 | 17 | 14 |
| Ex. 11 | CTAB 0.1% in Na$_2$CO$_3$ | yes | 10.9 | 0.01 | |
| Ex. 12 | DTAB 0.1% | yes | 6.8 | 0.25 | 1.24 |
| Ex. 13 | Glucopon 215 0.1% | no | 9 | 2.5 | |
| Ex. 14 | Tween 85 0.1% | no | 7.7 | 1.3 | |

TABLE 3

Oil-removing capacity of polymeric compounds differing in charge and molecular weight

| Ex. 15-28 | Aqueous solution | pH | Type and density of charge | Molecular weight | Result Test 1 |
|---|---|---|---|---|---|
| Ex. 15 | DP-FO 1% Polyacrylamide | 4.87 | charge+ | | No |
| Ex. 16 | DP/PT 2130 Polyacrylamide | 7.2 | charge+ | | No |
| Ex. 17 | FLOC 572 Polydimethyl-diallylammonium chloride | 5.6 | charge+ medium | Medium MW | Yes |
| Ex. 18 | FLOC 575 Polyamine | 5.41 | charge+ high | Low MW | No |
| Ex. 19 | FLOC 576 Polyamine | 4.4 | charge+ high | Medium MW | slight |
| Ex. 20 | SED AM 482 Polyamine | 5.01 | | Low MW | slight |
| Ex. 21 | Floc 412 Polymethylene Polyamine | 4.45 | | | No |
| Ex. 22 | Sedifloc 435 C Polyacrylamide | 4.27 | charge+ low | Low MW | No |
| Ex. 23 | Sedifloc 438 C Polyacrylamide | 4.12 | charge+ high | Low MW | No |
| Ex. 24 | FLOC 1403 C Polyacrylamide | 4.68 | charge+ low | Medium MW | No |
| Ex. 25 | FLOC 1408 C Polyacrylamide | 5.63 | charge+ medium | Medium MW | No |
| Ex. 26 | FLOC 1405 C Polyacrylamide | 5.14 | charge+ high | Medium MW | No |
| Ex. 27 | Sedifloc 710 Polyacrylamide | 6.5 | charge− low | High MW | No |
| Ex. 28 | Sedifloc 740 Polyacrylamide | 7.1 | charge− high | High Mw | No |

TABLE 4

Comparison interfacial tensions polymer (Floc 572) Surface-active agent (CTAB)

| Products | pH | $\gamma_s$ (mN/m) | $\gamma_i$ (mN/m) Oil A | $\gamma_i$ (mN/m) Heptane |
|---|---|---|---|---|
| Demin. water | 6 | 72 | 21.5 | 48.3 |
| Floc 572 0.1% | 6.49 | 54 | 21 | 23.78 |
| CTAB 0.1% | 6.8 | 33 | 0.29 | 2.73 |

The invention claimed is:
1. A method for increasing oil recovery from carbonate reservoirs having low permeability, comprising:
preparing a solution and subsequently injecting the solution into a well comprising crude oil where the crude oil has an interfacial tension >10 mN/m and an acid number higher than 0.25 to modify a wettability of a rock from an oil-wet condition to a water-wet condition without lowering a water-oil interfacial tension,
wherein the solution comprises one or more quaternary polyamines having formula (I)

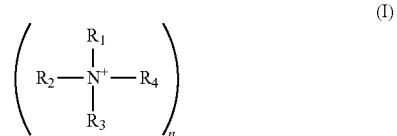

wherein n >=1
R1 represents H, CH$_3$, CH$_2$CH$_3$, C$_n$H$_{2n+1}$

R2 represents $H_2CHOHCH_2$, $CH_2$, $CH_2CH=CH_2$
R3 represents $CH_3$, $CH_2CH_3$, $C_nH_{2n+1}$
R4 represents $CH_2$, $CH_2CH=CH_2$
wherein when $R_2$ and $R_4$ are allyl group, they optionally jointly form aliphatic cyclic structures, wherein a ratio between the carbon atoms and nitrogen atoms (C/N) ranges from 2 to 30, and
wherein the solution comprises the one or more quaternary polyamines at a concentration in a range of from 0.01% to 20% by weight with respect to the total weight of the solution, and wherein the one or more quaternary polyamines in the solution complex one or more acid components present in the crude oil absorbed on rock forming the carbonate reservoir thereby removing the acid components from the rock.

2. The method according to claim 1, wherein the one or more quaternary polyamines are present at concentrations ranging from 0.01% to 10%.

3. The method according to claim 2, wherein the one or more quaternary polyamines are present at concentrations ranging from 0.05% to 5%.

4. The method according to claim 1, wherein n >=2.

5. The method according to claim 1, wherein the ratio between the carbon atoms and nitrogen atoms (C/N) ranges from 2 to 20.

6. The method according to claim 1, wherein the ratio between the carbon atoms and nitrogen atoms (C/N) ranges from 2 to 12.

7. The method according to claim 1, wherein the one or more quaternary polyamines are selected from the group consisting of the following structures:

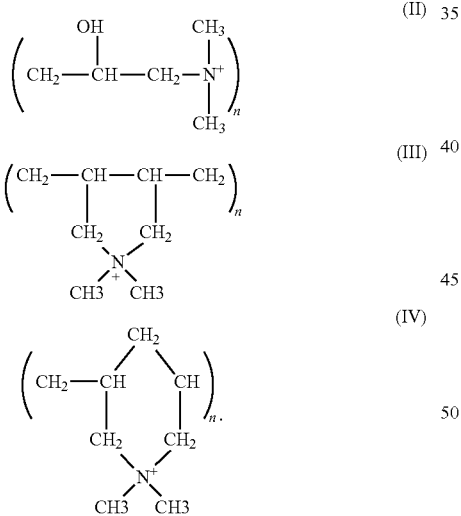

8. The method according to claim 1, wherein the one or more quaternary polyamines is polydiallyldimethylammonium chloride.

9. The method according to claim 1, wherein the one or more polyamines are copolymerized with polymers selected from the group consisting of polyacrylamides, polyamides, PEO, additives deriving from the quaternization of the Mannich reaction product, obtained by reacting formaldehyde, polyacrylamide and a secondary amine.

10. The method according to claim 1, wherein the one or more quaternary polyamines maintain the interfacial tension of the oil at values >2 mN/m.

11. The method according to claim 1, wherein the one or more quaternary polyamines maintain the interfacial tension of the oil at values >5 mN/m.

12. The method according to claim 1, wherein the one or more quaternary polyamines maintain the interfacial tension of the oil at values >10 mN/m.

13. The method according to claim 1, wherein the well comprises one or more carbonate reservoirs having a low permeability.

14. The method of claim 1, wherein the one or more quaternary polyamines are not surface active.

15. A method for increasing oil recovery from a carbonate reservoir having low permeability, comprising:
injecting a solution into a well present in the carbonate reservoir, wherein the carbonate reservoir comprises a crude oil having an interfacial tension of >10mN/m and an acid value higher than 0.25,
wherein the solution comprises one or more quaternary polyamines having formula (I)

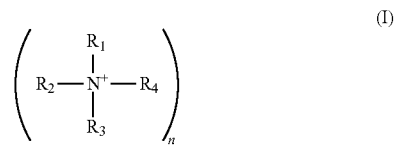

wherein n >=1
R1 represents H, $CH_3$, $CH_2CH_3$, $C_nH_{2n+1}$
R2 represents $H_2CHOHCH_2$, $CH_2$, $CH_2CH=CH_2$
R3 represents $CH_3$, $CH_2CH_3$, $C_nH_{2n+1}$
R4 represents $CH_2$, $CH_2CH=CH_2$
wherein when $R_2$ and $R_4$ are allyl group, they optionally jointly form aliphatic cyclic structures,
wherein a ratio between the carbon atoms and nitrogen atoms (C/N) ranges from 2 to 30, and
wherein the solution comprises the one or more quaternary polyamines at a concentration in a range of from 0.01% to 20% by weight with respect to the total weight of the solution, and wherein the one or more quaternary polyamines in the solution complex one or more acid components present in the crude oil absorbed on rock forming the carbonate reservoir thereby removing the acid components from the rock.

16. The method of claim 15, wherein the one or more quaternary polyamines are not surface active.

17. The method of claim 15, wherein the one or more quaternary polyamines are present at concentrations ranging from 0.01% to 10%.

18. The method of claim 15, wherein n ≥2.

19. The method of claim 15, wherein the ratio between the carbon atoms and nitrogen atoms (C/N) ranges from 2 to 20.

20. The method of claim 15, wherein the one or more quaternary polyamines are selected from the group consisting of the following structures:

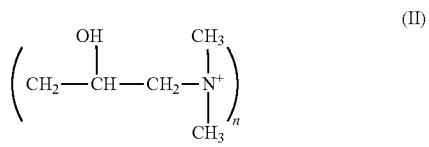

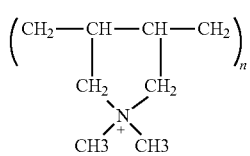

(III)

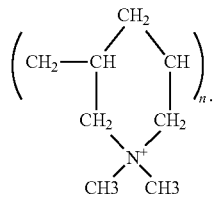

(IV)

21. The method of claim 15, wherein the one or more quaternary polyamines is polydiallyldimethylammonium chloride.

22. The method of claim 15, wherein the one or more quaternary polyamines are copolymerized with at least one polymer selected from the group consisting of a polyacrylamide, a polyamide, a PEO, and an additive deriving from the quaternization of the Mannich reaction product obtained by reacting formaldehyde, polyacrylamide and a secondary amine.

23. The method of claim 15, wherein the one or more quaternary polyamines maintain the interfacial tension of the oil at values >10 mN/m.

24. The method according to claim 1, wherein the well into which the solution is injected is present in an oil wet carbonate reservoir.

25. The method according to claim 15, wherein the carbonate reservoir is oil wet.

* * * * *